US012343946B2

(12) United States Patent
Rolland et al.

(10) Patent No.: US 12,343,946 B2
(45) Date of Patent: Jul. 1, 2025

(54) AUTOMATIC LAYUP AND COMPACTING MACHINE

(71) Applicant: SAFRAN NACELLES, Gonfreville-l'Orcher (FR)

(72) Inventors: Clément Rolland, Moissy-Cramayel (FR); Benjamin Provost, Moissy-Cramayel (FR); Maxime Lebegue, Moissy-Cramayel (FR); Renaud Venture, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/767,711

(22) PCT Filed: Oct. 7, 2020

(86) PCT No.: PCT/FR2020/051765
§ 371 (c)(1),
(2) Date: Apr. 8, 2022

(87) PCT Pub. No.: WO2021/069835
PCT Pub. Date: Apr. 15, 2021

(65) Prior Publication Data
US 2024/0083121 A1    Mar. 14, 2024

(30) Foreign Application Priority Data
Oct. 8, 2019    (FR) ...................................... 1911124

(51) Int. Cl.
*B29C 70/38*    (2006.01)
*B29C 70/54*    (2006.01)

(52) U.S. Cl.
CPC .............. *B29C 70/38* (2013.01); *B29C 70/54* (2013.01)

(58) Field of Classification Search
CPC ................................. B29C 70/38; B29C 70/54
See application file for complete search history.

(56) References Cited

U.S. PATENT DOCUMENTS

| 5,074,948 A | 12/1991 | Greffioz et al. |
| 8,191,947 B2 * | 6/2012 | Jouan De Kervanoael ................. B25J 15/0253 901/34 |

(Continued)

FOREIGN PATENT DOCUMENTS

| CN | 106233938 B * | 6/2018 | ............. A01D 46/30 |
| DE | 20 2014 103132 U1 | 10/2015 | |
| EP | 2 626 181 A2 | 8/2013 | |

OTHER PUBLICATIONS

KR International Search Report as issued in International Patent Application No. PCT/FR2020/051765, dated Jan. 18, 2021.

*Primary Examiner* — Nicholas R Krasnow
(74) *Attorney, Agent, or Firm* — Pillsbury Winthrop Shaw Pittman LLP

(57) ABSTRACT

A machine for automatically draping and compacting including a draping head that grasps, deposits and compacts fiber plies on a draping support, the draping head including first and second rigid supports and a gripper including a piece of elastically deformable material having a face to grasp a ply and intended to bear against a draping support surface. The first and second supports are connected to, respectively, a robotic handling device and to the first support and to the gripper. The draping head includes bearing force or pressure measuring elements between the first and second supports or housed in the first support. A control unit is connected to the bearing force or pressure measuring elements to monitor a compaction bearing force or pressure applied by the draping head.

5 Claims, 4 Drawing Sheets

(56) References Cited

U.S. PATENT DOCUMENTS

| | | |
|---|---|---|
| 9,873,230 B1 | 1/2018 | Desjardien et al. |
| 9,969,131 B2 | 5/2018 | Samak et al. |
| 2012/0330453 A1* | 12/2012 | Samak Sangari .... B25J 15/0616 |
| | | 700/121 |
| 2019/0184693 A1* | 6/2019 | Johnson ................. B29C 70/38 |

* cited by examiner

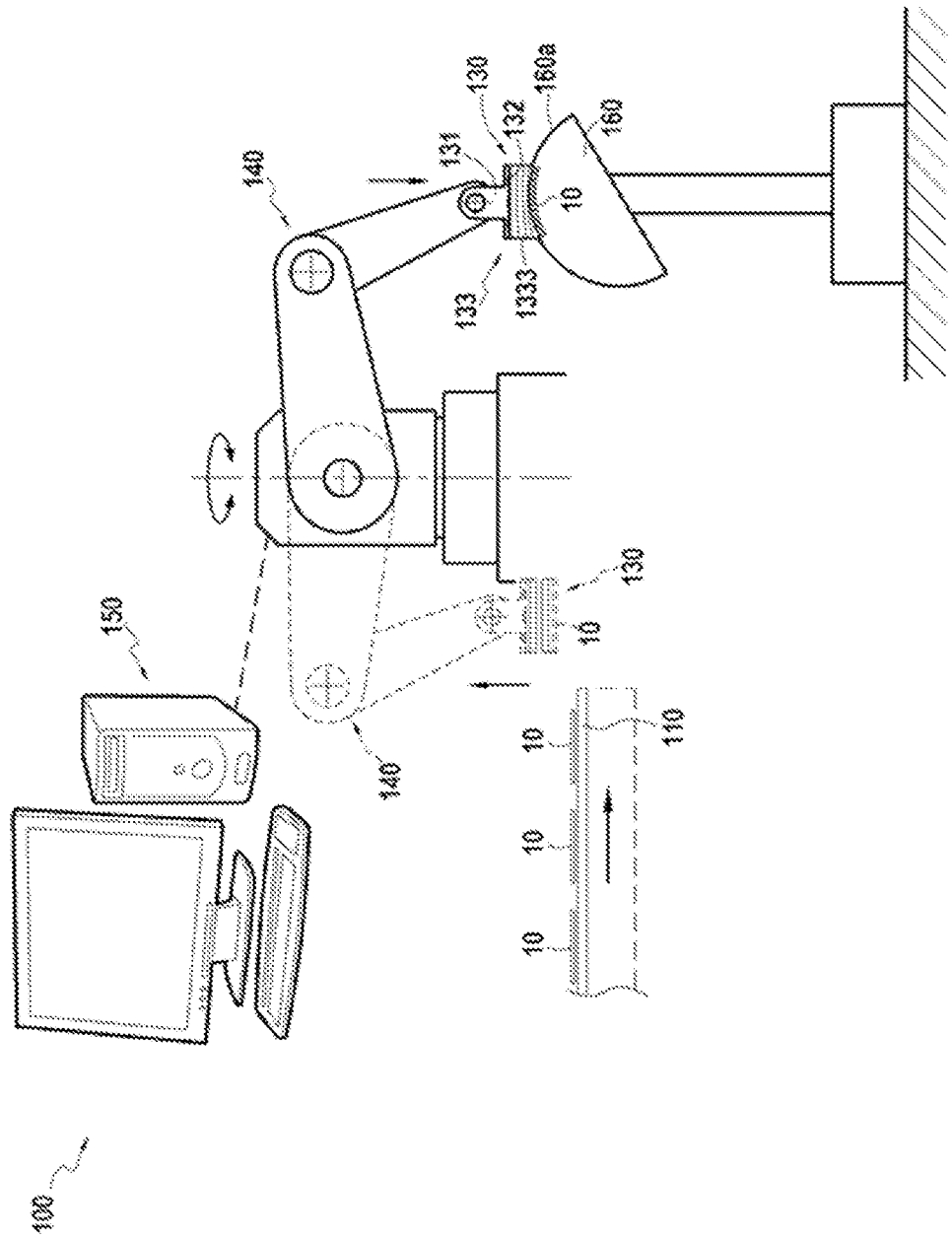
[Fig. 1]

[Fig. 2]
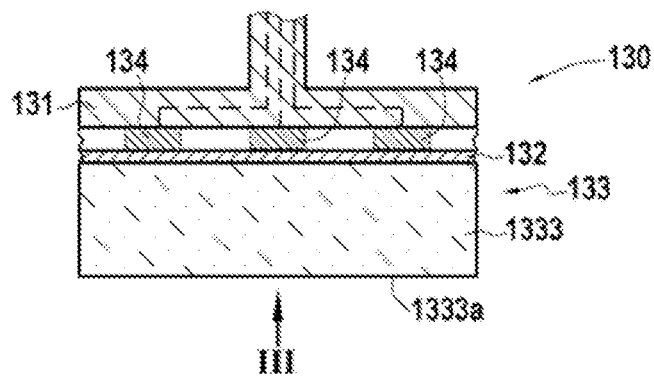
[Fig. 3]
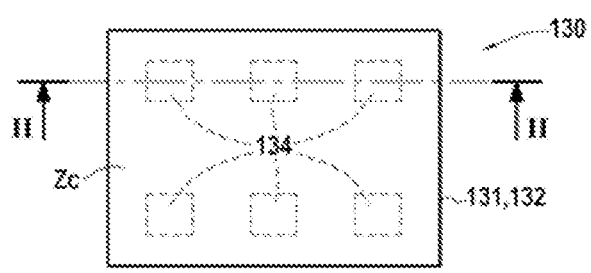
[Fig. 4]
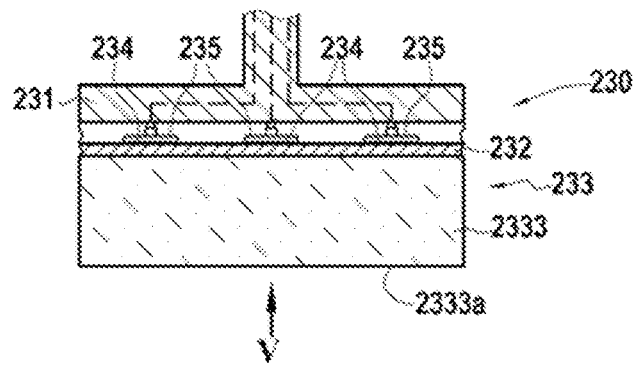

[Fig. 5]
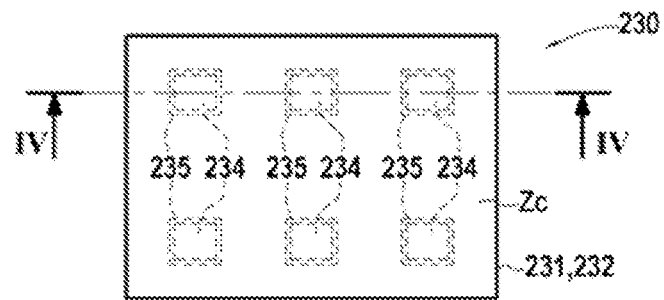
[Fig. 6]
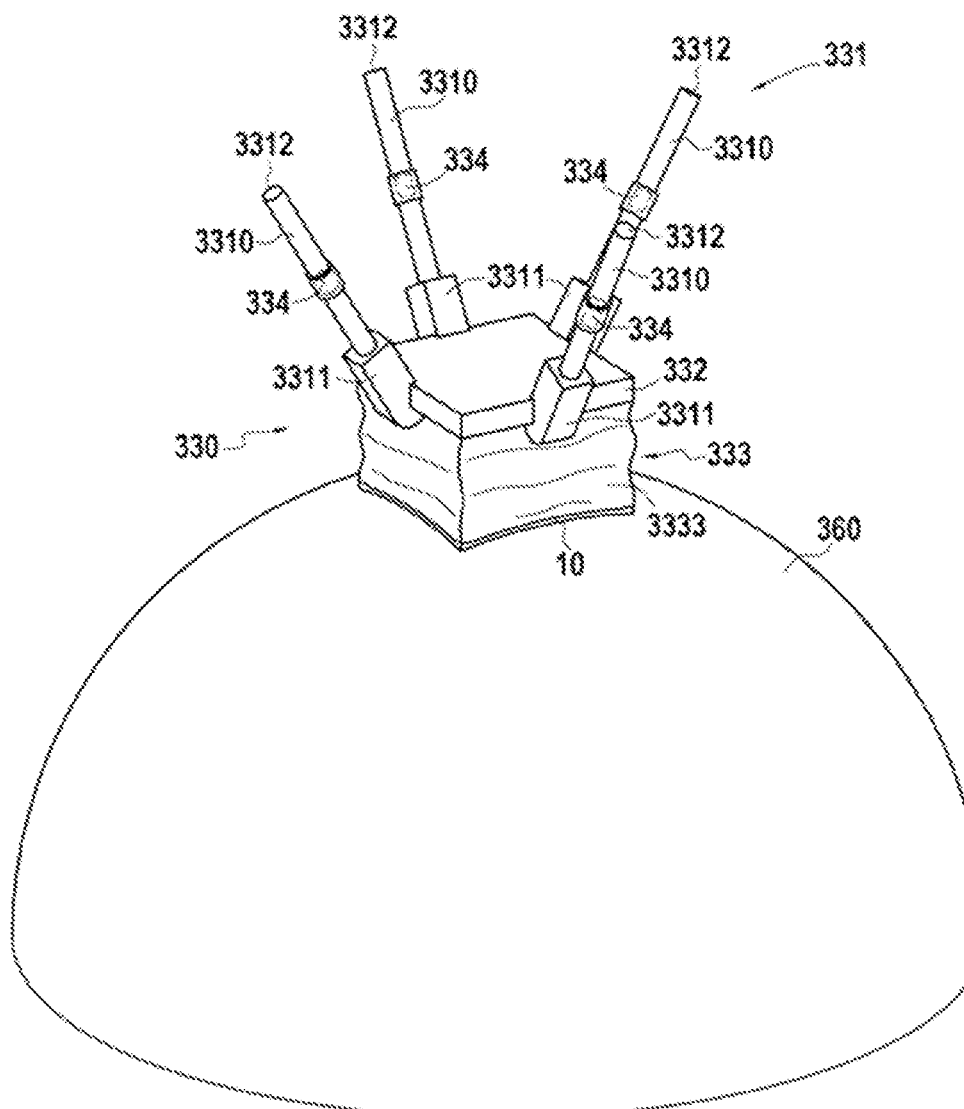

[Fig. 7A-7C]
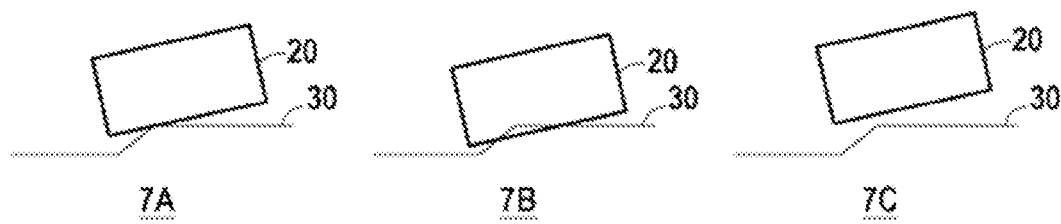
7A  7B  7C
[Fig. 8A-8B]
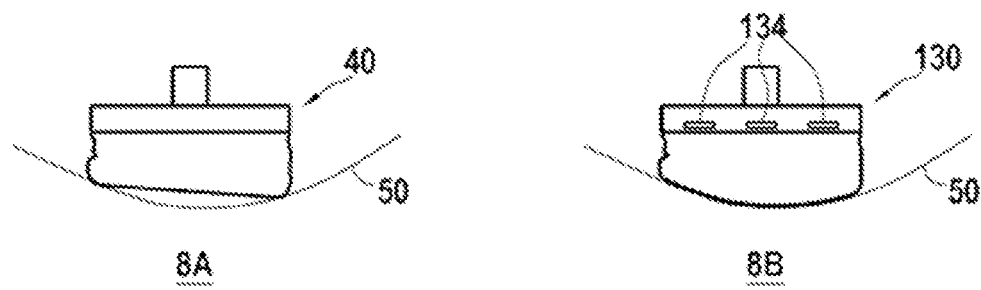
8A  8B
[Fig. 9A-9B]
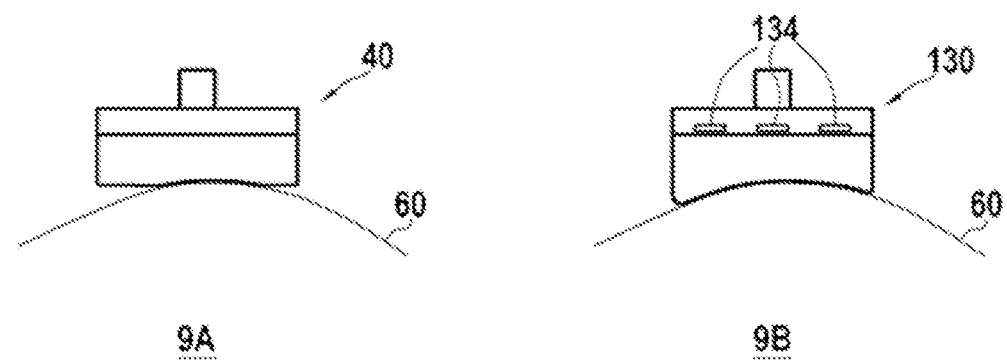
9A  9B

AUTOMATIC LAYUP AND COMPACTING MACHINE

CROSS-REFERENCE TO RELATED APPLICATIONS

This application is the U.S. National Stage of PCT/FR2020/051765, filed Oct. 7, 2020, which in turn claims priority to French patent application number 1911124 filed Oct. 8, 2019. The content of these applications are incorporated herein by reference in their entireties.

TECHNICAL FIELD

The present invention relates to the manufacture of pieces made of composite materials by draping the plies on a draping support. The invention relates more particularly to a machine allowing automatic draping and compaction of plies.

PRIOR ART

Automatic draping machines called "pick and place" machines are known, such as the machine described in document U.S. Pat. No. 9,873,230. These machines comprise a draping head mounted on a robotic handling device. The draping machine is programmed to control the movements of the draping head according to three operations: an operation of automatically grasping a fiber ply, an operation of automatically displacing the ply to a determined position on a draping support, then an operation of releasing or detaching the ply at the targeted spot (pick and place). These three operations are repeated for all the plies constituting the preform of the composite material piece to be manufactured. During each detachment of a ply on the draping support, this ply must be compacted in particular in order to expel the air present under the ply to guarantee correct shaping and a minimum porosity rate. To this end, the draping machine can comprise additional external devices to perform the compaction.

In addition to requiring an additional device for the compaction of the deposited plies, the draping machines of the prior art do not propose reliable solutions for ensuring precise and homogeneous compaction on all the plies, particularly when the surface of the draping support has a complex geometry.

DISCLOSURE OF THE INVENTION

The present invention aims to overcome the aforementioned drawbacks and to propose a solution that allows performing the compaction directly with the draping head, and this with a monitoring of the bearing force or pressure of the head on the draping support.

To this end, the invention proposes a machine for automatically draping and compacting plies, comprising a draping head able to grasp, displace, deposit and compact plies on a draping support, the draping head comprising a first rigid support, a second rigid support and a gripper comprising a piece of elastically deformable material having at least one face able to grasp a ply and intended to bear against a surface of the draping support, the first support being connected to a robotic handling device, the second rigid support being connected, on the one hand, to the first rigid support and, on the other hand, to the gripper, the second support forming a rigid connection between the gripper and the first rigid support. The draping machine is characterized in that the draping head comprises a plurality of bearing force or pressure measuring elements interposed between the first and second rigid supports or housed in the first rigid support and in that the draping machine comprises a control unit connected to the bearing force or pressure measuring elements, the control unit being configured to monitor a compaction bearing force or pressure applied by the draping head.

With the machine of the invention, it is thus possible to place and compact, automatically with a setpoint effort, plies on a draping support whatever its geometry. Thanks to the bearing force or pressure measuring elements, it is possible to measure the bearing force applied by the head in several spots in the latter. The compaction effort can thus be monitored and corrected locally by means of programming and servo-control in order to perform satisfactory compaction over the entire ply deposited.

According to one particular characteristic of the machine of the invention, bearing force or pressure measuring elements are distributed over the coupling area between the first and second rigid supports.

According to another particular characteristic of the machine of the invention, the bearing force or pressure measuring elements correspond to force sensors.

According to another particular characteristic of the machine of the invention, linear displacement devices are present in the coupling area between the first and second rigid supports, each linear displacement device comprising a position sensor corresponding to a bearing force or pressure measuring element.

According to another particular characteristic of the machine of the invention, the first rigid support comprises a plurality of arms each connected at one end to the handling device and at another end to the second rigid support, each arm comprising a bearing force or pressure measuring element.

According to another particular characteristic of the machine of the invention, the control unit is configured to adjust the compaction bearing force of the draping head on the surface of the draping support according to a target bearing force. It is thus possible in particular to limit the bearing force applied in the case of a draping and a compaction on a fragile support.

According to another particular characteristic of the machine of the invention, the control unit adjusts the compaction bearing force according to the bearing force measured by one or several determined measuring elements. It is thus possible to locally target the application of a compaction force or effort in order, for example, to ensure a compaction of an entire ply on a surface of complex geometry.

BRIEF DESCRIPTION OF THE DRAWINGS

FIG. 1 is a schematic view of a machine for automatically draping and compacting fiber plies in accordance with one embodiment of the invention, FIG. 2 is a schematic sectional view showing the draping head of the machine of FIG. 1, FIG. 3 is a sectional view along the plane II-II of the draping head of FIG. 2, FIG. 4 is a schematic sectional view of a draping head according to another embodiment, FIG. 5 is a sectional view along the plane IV-IV of the draping head of FIG. 4, FIG. 6 is a schematic perspective view of a draping head according to another embodiment, FIGS. 7A-7C are examples of placement of a patch on a complex surface via a draping head, FIGS. 8A and 8B show the improvement with a machine according to the invention when applying a compaction effort on a concave surface, FIGS. 9A and 9B show the improvement with a machine according to the invention when applying a compaction effort on a convex surface.

DESCRIPTION OF THE EMBODIMENTS

The invention generally applies to the automatic placement and compaction of plies on a draping support of any geometry. By "plies", it is meant here fiber plies corresponding in particular to woven or non-woven fiber strata and comprising equally continuous, long or short fibers, the fiber plies being able to be "dry" (absence of resin), powdery (particulate fillers) or pre-impregnated (with a resin). By "plies", it is meant here matrix precursor layers such as layers of polymer materials like thermoplastic or thermosetting materials.

By "draping support", it is meant here any type of support and in particular a polymerization mold (made of metal or thermoplastic material), polymerized or non-polymerized plies, or core materials such as aluminum or synthetic fiber (Nomex®) honeycombs, or polymer foams typically encountered in the "sandwich" composite structures.

The invention finds particular application in the manufacture of parts made of composite material by draping and compacting dry fiber plies or pre-impregnated with a thermosetting or thermoplastic resin on the surface of a draping support.

FIG. 1 represents an automatic draping and compacting machine 100 according to one embodiment of the invention. The machine 100 comprises a ply feeding device 110, a draping head 130 mounted on a robotic handling device 140 and a control unit 150 configured (programmed) to control the movements of the draping head 130. The unit 150 controls, via the robotic handling device, the movements of the draping head in order in particular to grasp, deposit and compact the plies 10 on a draping support 160. As illustrated in FIGS. 1 to 3, the draping head 130 comprises a first rigid support 131 connected to the robotic handling device 140 and a second rigid support 132 connected, on the one hand, to the first rigid support 131 and, on the other hand, to a gripper 133 comprising a piece of elastically deformable material 1333 having at least one face 1333a able to grasp each ply 10 and place it bearing against the surface 160a of the draping support 160. For this purpose, the piece of elastically deformable material 1333 has a network of porosity or channels connected to a suction device (not represented in FIGS. 1 to 3) allowing the grasping of the plies and the placement on the draping support 160, the suction device possibly also comprising a blowing means to facilitate the separation of the fiber plies with the piece made of elastically deformable material once the plies have been positioned and compacted on the surface of the draping mold.

In accordance with the invention and as illustrated in FIGS. 2 and 3, the draping head 130 further comprises a plurality of bearing force or pressure measuring elements 134 interposed between the first and second rigid supports 131 and 132. In the example described here, the bearing force or pressure measuring elements 134 correspond to force or effort sensors, for example of the strain gauge or piezoelectric type. The bearing force or pressure measuring elements 134 are distributed over the coupling area Zc defined between the first and second rigid supports 131 and 132. In this embodiment, the compaction effort is exerted by the robotic holding device 140.

The control unit 150 is connected to the bearing force or pressure measuring elements 134 in order to monitor the compaction bearing force applied by the draping head 130 as explained in detail below.

FIGS. 4 and 5 illustrate a draping head 230 in accordance with another embodiment of the invention. Like the draping head 130, the draping head 230 comprises a first rigid support 231 intended to be connected to a robotic handling device like the one already described previously in relation to FIG. 1 and a second rigid support 232 connected, on the one hand, to the first rigid support 231 and, on the other hand, to a gripper 233 comprising a piece of elastically deformable material 2333 having a face 2333a able to grasp each ply and to place it bearing against the surface of the draping mold. In this embodiment, linear displacement devices 235 (such as actuators, piezoelectrics, racks, endless screws, etc.) are present in the coupling area Zc between the first and second rigid supports 231 and 232. The linear displacement devices 235 are connected to the control unit of the automatic draping and compacting machine which monitors the movement of each linear displacement device. In this embodiment, the compaction effort is exerted in particular by the linear displacement devices 235. The effort exerted by the linear displacement devices can be combined with the effort exerted by the robotic handling device for the compaction of the fiber plies. In the example described here, each linear displacement device 235 comprises a position sensor 234 corresponding to a bearing force or pressure measuring element. The control unit is connected to the position sensors of each actuator in order to monitor the compaction bearing force applied by the draping head 230 as explained in detail below.

FIG. 6 illustrates a draping head 330 in accordance with another embodiment of the invention. The draping head 330 differs from the draping heads 130 and 230 described previously in that the first rigid support 331 comprises arms 3310 each including a first end 3311 connected to a second rigid support 332 and a second end 3312 connected to a robotic handling device (not represented in FIG. 6). The second rigid support 332 is also connected to a gripper 333 comprising a piece of elastically deformable material 3333 able to grasp plies 10 and to place them bearing against the surface of a draping support 360. In this embodiment, the draping head 330 further comprises a plurality of bearing force or pressure measuring elements 334 each housed in an arm 3310. In the example described here, the bearing force or pressure measuring elements 334 correspond to force or effort sensors, for example of the strain gauge or piezoelectric type. In this embodiment, the compaction effort is exerted by the robotic handling device. The control unit of the machine is connected to the bearing pressure measuring elements 334 in order to monitor the compaction bearing force applied by the draping head 330 as explained in detail below.

With a draping head provided with bearing force or pressure measuring elements connected to a control unit, the draping and compacting machine of the invention allows ensuring contact with a surface of a draping support and this with a determined bearing force and whatever the geometry of the surface to be draped. FIG. 7A illustrates the theoretical contact programmed initially in the control unit of a draping machine between a draping head 20 and a surface 30 of a draping support. FIG. 7B illustrates the actual position of the draping head 20 when the latter is not equipped with bearing force or pressure measuring elements and when the actual distance between the draping head 20 and the surface of the mold 30 is smaller than the initially programmed theoretical distance. In this case, the draping head exerts a too high bearing force compared to the intended theoretical bearing force, which can damage the draping support when the latter is fragile like a honeycomb core material for example. With the machine of the invention, the bearing pressure measuring elements allow adjusting the bearing force exerted by the draping head 20 so as to obtain a contact between the latter and the surface 30 conforming to the theoretical contact of FIG. 7A. FIG. 7C illustrates the actual position of the draping head 20 when the latter is not equipped with bearing force or pressure measuring elements and when the actual distance between the draping head 20 and the surface of the mold 30 is greater than the initially programmed theoretical distance. In this case, the draping head exerts an insufficient bearing force compared to the intended theoretical bearing force. With the machine of the invention, the bearing force or pressure measuring elements allow adjusting the bearing force exerted by the draping head 20 so as to obtain a contact between the latter and the surface 30 conforming to the theoretical contact of FIG. 7A.

FIGS. 8A and 8B illustrate the application of a compaction effort by a draping head on a concave surface portion of a draping support 50. FIG. 8A illustrates the application of a compaction effort with a draping head 40 devoid of a plurality of bearing force or pressure measuring elements as in the present invention, the bearing pressure not being able to be measured locally at different spots in the interface between the first and second rigid supports. As illustrated in FIG. 8A, it is observed that, in this case, only the contact between the edges of the piece made of elastically deformable material of the draping head 40 is sufficient to reach the bearing force programmed in the machine, which results in an absence of contact and, consequently, of application of compaction force at the central part of the piece made of elastically deformable material of the draping head 40. In FIG. 8B, the compaction effort is exerted by the draping head 130 described previously which comprises several bearing force or pressure measuring elements 134 distributed over the coupling area between the first and second rigid supports. In this case, it is possible to program the application of a determined bearing force on one or several areas covered by one or several bearing pressure measuring elements 134. In the case of a concave surface, preferably the application of a bearing force is programmed and monitored using one or several bearing force or pressure measuring elements located at the central part of the piece made of elastically deformable material of the draping head 130, which allows ensuring the application of a compaction effort on the entire portion of the surface of the support 50 facing the piece made of elastically deformable material as illustrated in FIG. 8B.

FIGS. 9A and 9B illustrate the application of a compaction effort by a draping head on a convex surface portion of a draping support 60. FIG. 9A illustrates the application of a compaction effort with a draping head 40 devoid of a plurality of bearing force or pressure measuring elements as in the present invention, the bearing pressure not being able to be measured locally at different spots in the interface between the first and second rigid supports. As illustrated in FIG. 9A, it is observed that, in this case, only the contact between the central part of the piece of elastically deformable material of the draping head 40 is sufficient to reach the bearing force programmed in the machine, which results in an absence of contact and, consequently, of application of a compaction effort at the edges of the piece made of elastically deformable material of the draping head 40. In FIG. 9B, the compaction effort is exerted by the draping head 130 described previously which comprises several bearing force or pressure measuring elements 134 distributed over the coupling area between the first and second rigid supports. In this case, it is possible to program the application of a determined bearing force on one or several areas covered by one or several bearing force or pressure measuring elements 134. In the case of a convex surface, preferably the application of a bearing force is programmed and monitored using one or several bearing force or pressure measuring elements located at the edges of the piece made of elastically deformable material of the draping head 130, which allows ensuring the application of a compaction effort on the entire portion of the surface of the support 50 facing the piece made of elastically deformable material as illustrated in FIG. 9B.

The machine according to the invention allows, in the same operation, draping and compacting plies on any type of draping support. The machine according to the invention further allows very accurately monitoring of the applied compaction effort, in terms of both effort value and application areas. The machine of the invention is thus capable of measuring the applied effort and adjusting it according to a programmed target effort. This monitoring of the compaction effort can be carried out on areas defined by one or several bearing force or pressure measuring elements. The machine according to the invention therefore allows servo-controlling the means for applying the compaction effort, such as in particular the robotic handling device of the draping head and/or actuation means (linear displacement devices) present in the draping head.

The invention claimed is:

1. A machine for automatically draping and compacting plies, comprising:
    a draping support, and
    a draping head adapted to grasp, deposit and compact plies on the draping support, the draping head comprising a first rigid support, a second rigid support and a gripper comprising a piece of elastically deformable material having at least one face adapted to grasp a ply and intended to bear against a surface of the draping support, the first rigid support being connected to a robotic handling device, the second rigid support being connected to the first rigid support and to the gripper,
    wherein the draping head comprises a plurality of bearing force or pressure measuring elements interposed between the first and second rigid supports or housed in the first rigid support and wherein the draping machine comprises a control unit connected to the bearing force or pressure measuring elements, the control unit being configured to monitor a compaction bearing force or pressure applied by the draping head,
    wherein the bearing force or pressure measuring elements are distributed over a coupling area between the first and second rigid supports, and
    wherein linear displacement devices are present in the coupling area between the first and second rigid supports, each linear displacement device comprising a position sensor corresponding to a bearing pressure measuring element.

2. The machine according to claim 1, wherein the bearing force or pressure measuring elements are force sensors.

3. The machine according to claim 1, wherein the first rigid support comprises a plurality of arms each connected at one end to the robotic handling device and at another end to the second rigid support, each arm comprising a bearing force or pressure measuring element.

4. The machine according to claim 1, wherein the control unit is configured to adjust the compaction bearing force of the draping head on the surface of the draping support or mold according to a target bearing force.

5. The machine according to claim 4, wherein the control unit adjusts the compaction bearing force according to the bearing force measured by one or several determined measuring elements.

* * * * *